United States Patent
Okabe et al.

(10) Patent No.: US 10,212,015 B2
(45) Date of Patent: Feb. 19, 2019

(54) RECEIVING DEVICE AND SENDING DEVICE

(71) Applicant: FUJITSU LIMITED, Kawasaki-shi, Kanagawa (JP)

(72) Inventors: Ryou Okabe, Shinagawa (JP); Tomoo Takahara, Kawasaki (JP); Toshiki Tanaka, Setagaya (JP); Masato Nishihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 235 days.

(21) Appl. No.: 14/993,192

(22) Filed: Jan. 12, 2016

(65) Prior Publication Data

US 2016/0248500 A1 Aug. 25, 2016

(30) Foreign Application Priority Data

Feb. 25, 2015 (JP) .................................. 2015-035622

(51) Int. Cl.
*H04B 10/69* (2013.01)
*H04L 27/26* (2006.01)
*H04B 10/548* (2013.01)
*H04B 10/2513* (2013.01)

(52) U.S. Cl.
CPC ..... *H04L 27/2647* (2013.01); *H04B 10/2513* (2013.01); *H04B 10/548* (2013.01); *H04B 10/6971* (2013.01)

(58) Field of Classification Search
CPC ............ H04B 10/548; H04B 10/2513; H04B 10/6971; H04L 27/2647

USPC ................................. 398/140–142, 147–150
See application file for complete search history.

(56) References Cited

U.S. PATENT DOCUMENTS

| | | | | |
|---|---|---|---|---|
| 6,871,024 | B2 * | 3/2005 | Nishimoto | H04B 10/25133 398/147 |
| 7,027,464 | B1 * | 4/2006 | Nakahara | H04L 5/0048 370/203 |
| 7,409,009 | B2 * | 8/2008 | Akhtman | H04L 27/2624 375/296 |
| 7,421,029 | B2 * | 9/2008 | Yasotharan | H03H 17/0294 370/509 |
| 7,627,253 | B1 * | 12/2009 | Ng | H04B 10/2575 398/102 |
| 8,098,751 | B2 * | 1/2012 | Shattil | H04L 1/04 375/260 |
| 8,390,798 | B2 * | 3/2013 | Ohtani | G01M 11/335 356/73.1 |

(Continued)

FOREIGN PATENT DOCUMENTS

| | | |
|---|---|---|
| JP | 4575703 | 11/2010 |
| JP | 5523582 | 6/2014 |
| WO | 2012073590 | 6/2012 |

*Primary Examiner* — Amritbir K Sandhu
(74) *Attorney, Agent, or Firm* — Fujitsu Patent Center

(57) ABSTRACT

A receiving device includes an optical filter, an acquisition unit, a first determination unit, and a filter setting unit. The optical filter transmits an optical DMT signal received from a sending device. The acquisition unit acquires the transmission characteristics of the optical DMT signal received from the sending device. The first determination unit determines a filter frequency of the optical filter that removes a dip from the optical DMT signal on the basis of the acquired transmission characteristics. The filter setting unit sets the determined filter frequency in the optical filter.

8 Claims, 16 Drawing Sheets

(56) References Cited

U.S. PATENT DOCUMENTS

| | | | |
|---|---|---|---|
| 8,744,262 B2* | 6/2014 | Barnard | H04B 10/572 398/49 |
| 8,971,702 B2* | 3/2015 | Le Taillandier De Gabory | G01M 11/338 398/29 |
| 2003/0123789 A1* | 7/2003 | Miyata | H04B 10/25073 385/24 |
| 2006/0251264 A1* | 11/2006 | Higashihara | G01H 13/00 381/58 |
| 2009/0116844 A1* | 5/2009 | Tanaka | H04B 10/677 398/115 |
| 2010/0142956 A1* | 6/2010 | Larikova | H04B 10/2507 398/79 |
| 2010/0166425 A1* | 7/2010 | Onaka | H04J 14/0221 398/79 |
| 2010/0178057 A1* | 7/2010 | Shieh | H04L 25/0224 398/79 |
| 2011/0019749 A1* | 1/2011 | Wilhelmsson | H04L 25/022 375/259 |
| 2012/0209900 A1* | 8/2012 | Sorokine | H04L 25/0216 708/309 |
| 2012/0281981 A1* | 11/2012 | Le Taillandier De Gabory | G01M 11/338 398/29 |
| 2013/0136451 A1 | 5/2013 | Yoshida et al. | |
| 2014/0269868 A1* | 9/2014 | Werner | H04B 3/54 375/224 |
| 2015/0341138 A1* | 11/2015 | Ishihara | H04B 10/25133 398/35 |
| 2016/0112139 A1* | 4/2016 | Tanaka | H03F 1/32 398/43 |
| 2016/0218812 A1* | 7/2016 | Okabe | H04B 10/60 |
| 2016/0248500 A1* | 8/2016 | Okabe | H04L 27/2647 |
| 2016/0285548 A1* | 9/2016 | Nishihara | H04B 10/50 |
| 2017/0070286 A1* | 3/2017 | Nishihara | H04B 10/07957 |
| 2017/0078027 A1* | 3/2017 | Okabe | H04B 10/548 |
| 2017/0078979 A1* | 3/2017 | Osterling | H04W 24/06 |
| 2017/0093515 A1* | 3/2017 | Tanaka | H04B 10/564 |
| 2017/0230120 A1* | 8/2017 | Okabe | H04B 10/0795 |
| 2017/0338892 A1* | 11/2017 | Takahara | H04B 10/69 |

* cited by examiner

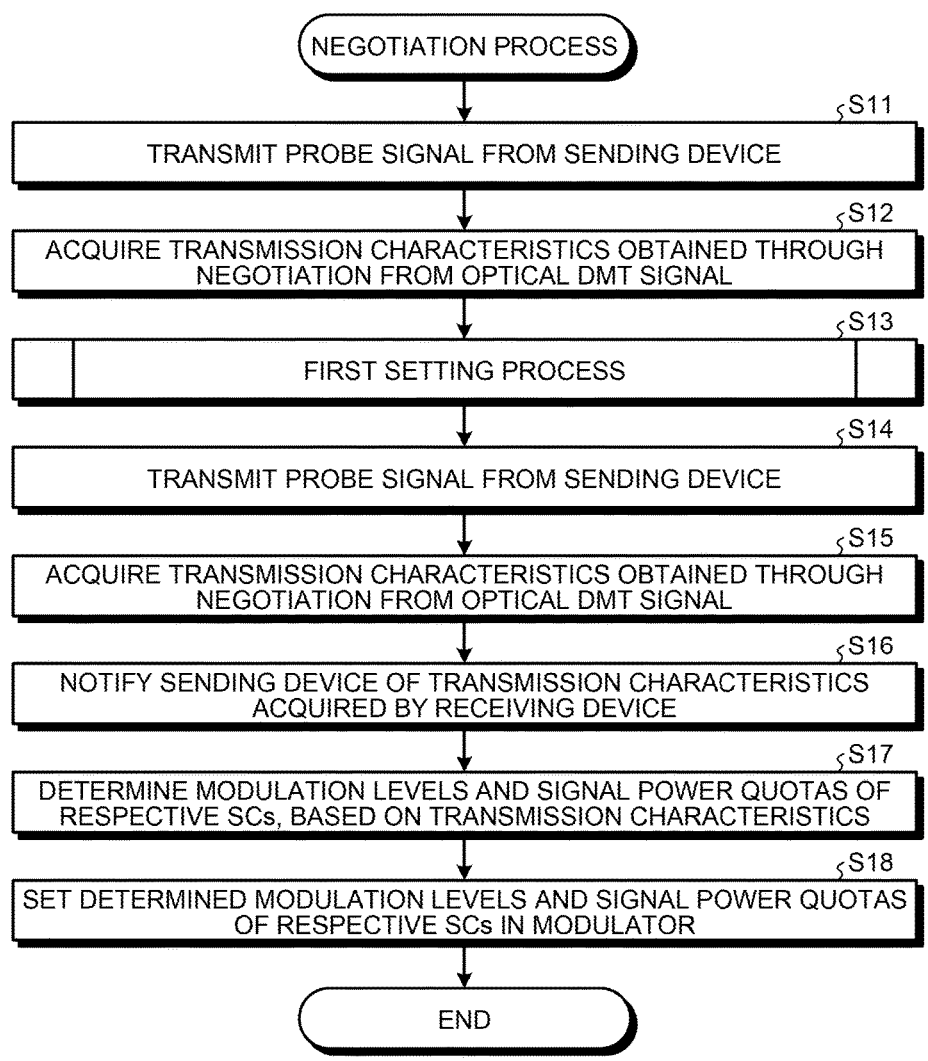

FIG.17

| MEANS | LOSS | STRUCTURE | AMOUNT OF COMPENSATION | DELAY | SETTING | WDM |
|---|---|---|---|---|---|---|
| DCF | LARGE | SIMPLE | FIXED | LARGE | RECEIVING/ SENDING | APPLICABLE |
| VIPA | LARGE | COMPLICATED | VARIABLE | SMALL | RECEIVING/ SENDING | |
| FBG | SMALL | SIMPLE | FIXED | SMALL | RECEIVING/ SENDING | APPLICABLE |
| PHASE CONJUGATION (OPC) | LARGE | COMPLICATED | FIXED | MEDIUM | RELAY | APPLICABLE |
| OPTICAL FOURIER (OFT) | LARGE | COMPLICATED | ANY | MEDIUM | RECEIVING | |
| SSB (PHASE METHOD) | LARGE | COMPLICATED | ANY | SMALL | RECEIVING/ SENDING | |
| SSB (FILTER) | SMALL | SIMPLE | ANY | SMALL | RECEIVING/ SENDING | (APPLICABLE) IL, AWG |
| VSB (FILTER) | SMALL | SIMPLE | ANY (LIMITED) | SMALL | RECEIVING/ SENDING | (APPLICABLE) IL, AWG |

- -●- - OPTICAL DMT SIGNAL (WITHOUT VSB SHAPING)
—□— OPTICAL DMT SIGNAL SUBJECTED TO SSB SHAPING
—▲— VSB (OPTICAL DMT SIGNAL SUBJECTED TO VSB SHAPING ACCORDING TO THIRD EMBODIMENT)
----○---- VSB (OPTICAL DMT SIGNAL SUBJECTED TO VSB SHAPING ACCORDING TO FIRST EMBODIMENT)

RECEIVING DEVICE AND SENDING DEVICE

CROSS-REFERENCE TO RELATED APPLICATION

This application is based upon and claims the benefit of priority of the prior Japanese Patent Application No. 2015-035622, filed on Feb. 25, 2015, the entire contents of which are incorporated herein by reference.

FIELD

The embodiments discussed herein are directed to a receiving device and a sending device.

BACKGROUND

In recent years, there have been demands for transmission systems that enable optical transmission of a large volume of data with an optical network. As transmission systems for optical networks, for example, multicarrier modulation systems, such as the discrete multi-tone (DMT) modulation system, are known. The DMT-modulation system is one of multicarrier transmission technique based on the orthogonal frequency division multiplexing (OFDM) technology. The DMT modulation system is a technique in which data is allocated to multiple subcarriers (SC) at different frequencies and the sets of data allocated to the respective SCs are modulated based on the modulation levels and the signal power quotas to transmit the data at high speed as a DMT signal.

When the system starts, an optical transmitting device employing the DMT modulation system performs a negotiation using a probe signal with an optical transmitting device that is a partner with which the optical transmitting device communicates and, acquires the reception characteristics based on the result of the negotiation, and sets the acquired reception characteristics for the transmission characteristics. According to the transmission characteristics, which are set, the optical transmitting device determines the modulation levels (the number of bits) and the signal power quotas corresponding to respective SCs. The optical transmitting device then modulates sets of data respectively allocated to the SCs based on the determined modulation levels and signal power quotas corresponding to the respective SCs to generate a DMT signal.

FIG. 19 is an explanatory view illustrating exemplary transmission characteristics relating to an optical DMT signal in which a dip occurs. Compared to the ideal transmission characteristics X11, the transmission characteristics X12 represented in FIG. 1 deteriorate as the allocated frequency increases because of the limitation on the band due to the frequency characteristics of the device in the optical transmitting device. Furthermore, in addition to the frequency characteristics of the device, noise, and deterioration in nonlinearity, a dip D occurs due to interaction between the chirp occurring in an optical sending device and wavelength dispersion on the optical transmission path, which deteriorates the transmission characteristics X13.

The frequency at which the dip D occurs can be calculated by assigning the modulation factor for the optical DMT signal, the chirp of the optical sending device, the wavelength of the optical DMT signal, the wavelength dispersion on the optical transmission path, and the fiber length (transmission distance) of the optical transmission path to Equation (1).

$$I_R = m\sqrt{1+\alpha^2}\left|\cos\left(\frac{\pi\lambda^2 DLf^2}{c} + \tan^{-1}(\alpha)\right)\right| \quad (1)$$

where m is a modulation factor, $\alpha$ is a chirp, $\lambda$ is a wavelength, D is a dispersion, and L is a fiber length.

FIG. 20 is an explanatory view illustrating exemplary occurrence of a dip relating to the optical DMT signal according to each transmission distance. Even in the same optical DMT signal, as illustrated in FIG. 20, a dip occurs at different frequencies according to the transmission distances of 10 km, 20 km, 40 km, and 80 km of single mode fiber (SMF) and the dip significantly lowers the relative intensity significantly, which deteriorates the transmission characteristics. This puts a limitation on the transmission capacity and transmission distance of the transmission characteristics.

Japanese Patent No. 4575703
Japanese Patent No. 5523582

FIG. 21 is an explanatory view illustrating exemplary transmission characteristics (transmission capacity to transmission distance) of an optical DMT signal. The transmission characteristics X14 represented in FIG. 21 are the transmission characteristics of an optical DMT signal. According to the transmission characteristics X14, while the transmission capacity of the transmission characteristics X14 is 130 Gbps when the transmission distance is 0 km (back to back: B to B), a dip occurs when the transmission distance is 10 km, which deteriorates the transmission capacity to 100 Gbps. In this way, the transmission characteristics of the optical DMIT signal deteriorates due to the occurrence of dip resulting from interaction between, for example, the chirp of the optical sending unit and the wavelength dispersion that accumulates on the optical path.

SUMMARY

According to an aspect of the embodiments, a receiving device includes a filter, a measurement unit, a determination unit and s setting unit. The filter transmits a multicarrier signal that is received from a partner device. The measurement unit measures the transmission characteristics of the multicarrier signal received from the partner device. The determination unit determines a filter frequency of the filter that removes a dip from the multicarrier signal, on the basis of the measured transmission characteristics. The setting unit sets the determined filter frequency in the filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart illustrating exemplary processing operations of the optical transmission system relating to a negotiation process;

FIG. 17 is an explanatory view illustrating exemplary comparison of various dispersion compensation systems;

DESCRIPTION OF EMBODIMENTS

Preferred embodiments of the present invention will be explained with reference to accompanying drawings. The embodiments are not to be construed as limiting the disclosed technology. The following embodiments may be combined as appropriate as long as no contradiction is caused.

[a] First Embodiment

Figure 1:
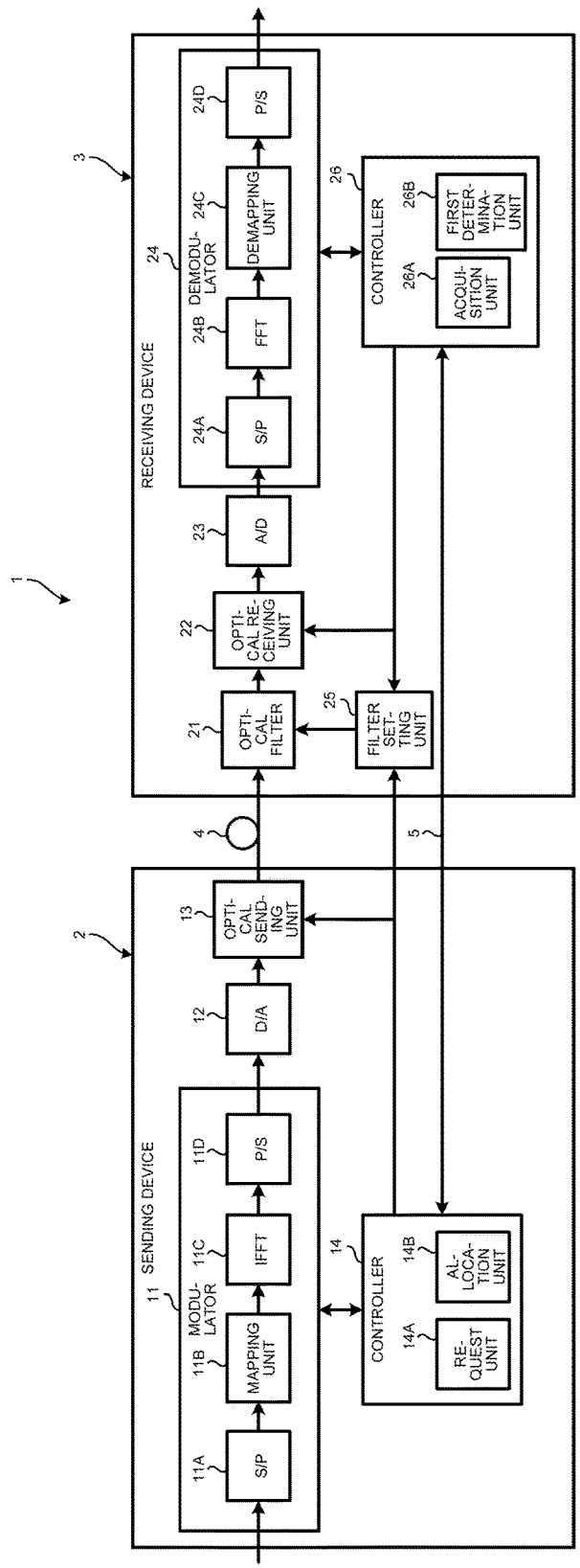
FIG. 1 is an explanatory view illustrating an exemplary optical transmission system according to a first embodiment of the present invention.

FIG. 1 is an explanatory view illustrating an exemplary optical transmission system 1 according to a first embodiment of the present invention. The transmission system 1 illustrated in FIG. 1 includes a sending device 2, a receiving device 3 that is a partner with which the sending device 2 communicates, and an optical transmission path 4 connecting the sending device 2 and the partner receiving device 3. The sending device 2 and the receiving device 3 are transmitting devices, such as optical modules stored in, for example, an optical metro network, an optical access network, or an optical core network. For the convenience of description, the sending device 2 and the receiving device 3 are described as being separated from each other; however, each of the transmitting device and the partner transmitting device incorporates the sending device 2 and the receiving device 3. The sending device 2 in the transmitting device transmits an optical DMT signal to the receiving device 3 in the partner transmitting device and the sending device 2 in the partner sending device 2 transmits an optical DMT signal to the receiving device 3 in the transmitting device.

The sending device 2 includes a modulator 11, a digital analog (D/A) 12, an optical sending unit 13, and a controller 14. The modulator 11 is a modulator that performs DMT modulation on a client signal. The modulator 11 includes a serial/parallel (S/P) 11A, a mapping unit 11B, an inverse fast Fourier transform (IFFT) 11C, and a parallel/serial (P/S) 11D. The S/P 11A converts a serial client signal into parallel data corresponding to the number of subcarriers (SC) in a DMT signal. The mapping unit 11B maps the data of the client signal to be allocated to the respective SCs on the basis of the modulation levels and the signal power quotas corresponding to the respective SCs that are set. Based on the modulation levels and the signal power quotas corresponding to the respective SCs that are set, the IFFT 11C performs IFFT processing to divide the data of the mapping output into sets of data for the respective SCs and outputs a DMT signal. The P/S 11D performs serial conversion on the DMT signal of the sets of data of the respective SCs and inputs the serial DMT signal to the D/A 12.

The D/A 12 performs analog conversion on the serial DMT data of the serial data and transmits the analog DMT signal to the optical sending unit 13. The optical sending unit 13 optically modulates the DMT signal that is amplified with an amplifier (not depicted) by using an optical signal of a laser diode (LD) (not depicted) and outputs the resulting optical DMT signal to the optical transmission path 4. The optical transmission path 4 is, for example, an optical fiber that transmits an optical DMT signal from the sending device 2 to the partner receiving device 3.

The controller 14 controls the whole sending device 2. The controller 14 includes a request unit 14A and an allocation unit 14B. When the optical transmission system 1 starts, the request unit 14A issues a request for starting negotiation in which an optical DMT signal that is a probe signal is transmitted to the partner receiving device 3. The probe signal is a test signal that is used for negotiation that is executed when the optical transmission system 1 starts and that has the same constant modulation level and the same signal power quota corresponding to each SC. The allocation unit 14B determines modulation levels and signal power quotas corresponding to the respective SCs in accordance with the transmission characteristics obtained through the negotiation of the probe signal and sets, in the modulator 11, the determined modulation levels and the signal power quotas corresponding to the respective SCs.

The receiving device 3 includes an optical filter 21, an optical receiving unit 22, an analog/digital (A/D) 23, a demodulator 24, a filter setting unit 25, and a controller 26. The optical filter 21 is a variable filter that transmits an optical DMT signal received from the optical transmission path 4. The optical filter 21 performs vestigial sideband (VSB) shaping on the optical DMT signal according to the filter frequency that is set. Accordingly, the dip occurring in the optical DMT signal can be removed. Note that, as described above, the dip occurs due to interaction between a chirp occurring in the optical sending unit 13 in the sending device 2 and the wavelength dispersion accumulated on the optical path 4.

The optical receiving unit 22 performs electrical conversion on the optical DMT signal with a photo diode (PD), amplifies the electrical DMT signal, and inputs the amplified DMT signal into the A/D 23. The A/D 23 performs digital conversion on the received DMT signal and inputs the DMT signal subjected to digital conversion into the demodulator 24.

The demodulator 24 includes a S/P 24A, a fast Fourier transform (FFT) 24B, a demapping unit 24C, and a P/S 24D. The S/P 24A converts the data of the DMT signal from the A/D 23 into parallel data for each SC. Based on the modulation levels and the signal power quotas corresponding to the respective SCs, the FFT 24B recovers the data of each SC to the data before IFFT processing. The demapping unit 24C demaps the restored data to obtain the data before mapping and inputs the data before mapping to the P/S 24D. The P/S 24D performs serial conversion on the input data of the client signal before mapping and outputs the data serial data.

The filter setting unit 25 is a circuit that drives and controls the optical filter 21 so as to shift the filter frequency of the optical filter 21. The controller 26 controls the whole receiving device 3. The controller 26 includes an acquisition unit 26A and a first determination unit 26B. The acquisition unit 26A acquires the transmission characteristics obtained through the negotiation from the optical DMT signal that is the probe signal and is received from the sending device 2. The acquisition unit 26A acquires SNR information containing the SNR corresponding to each SC number as the transmission characteristics of the optical DMT signal from the demapping unit 24C. By performing baud rate conversion in which the SCs are modulated, the frequency information of the SC numbers can be acquired. The first determination unit 26B determines a filter frequency of the optical filter 21 on the basis of the transmission characteristics obtained through the negotiation.

Figure 2:
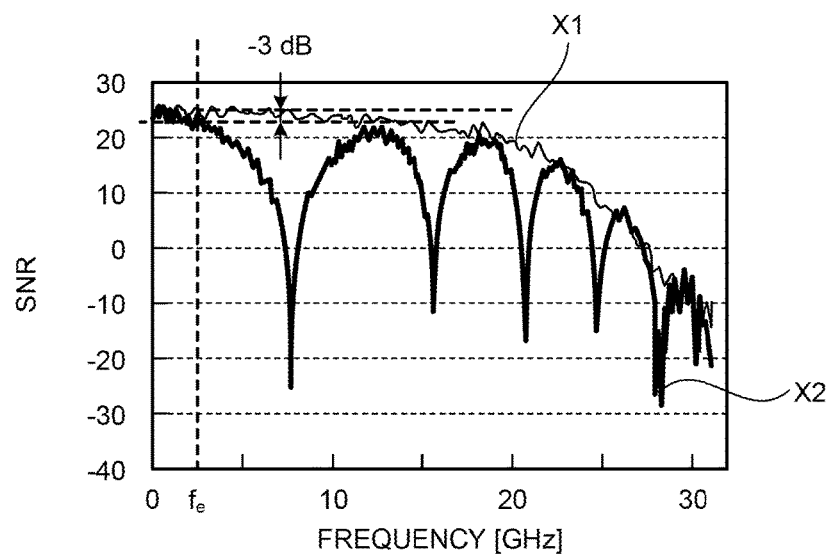
FIG. 2 is an explanatory view illustrating exemplary transmission characteristics (SNR to allocated frequency) of an optical DMT signal.

FIG. 2 is an explanatory view illustrating exemplary transmission characteristics (SNR to frequency) of an optical DMT signal. This frequency of the optical DMT signal is the frequency obtained after conversion of the received optical DMT signal into an electronic signal. The transmission characteristic X1 represented in FIG. 2 is ideal B to B (the transmission distance is 0 km) optical DMT signal transmission characteristics and the transmission characteristics X2 represented in FIG. 2 are the transmission characteristics of the optical DMT signal before VSB shaping. In the transmission characteristic X2, multiple dips have occurred.

Figure 3:
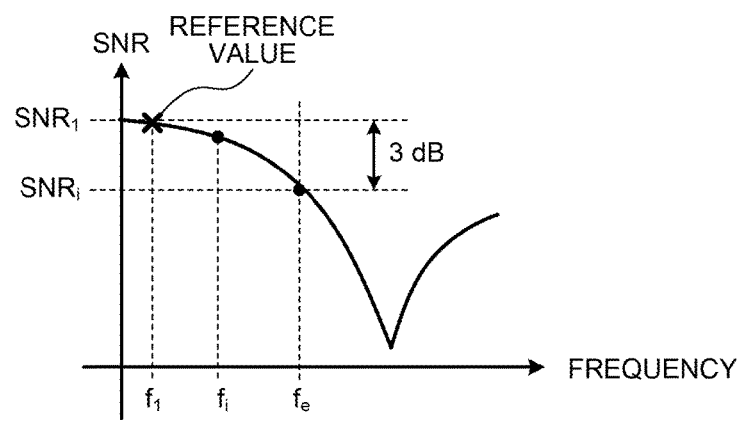
FIG. 3 is an explanatory view illustrating an exemplary method of acquiring an offset frequency of an optical filter.

FIG. 3 is an explanatory view illustrating an exemplary method of acquiring an offset frequency of the optical filter 21. The acquisition unit 26A of the controller 26 in the receiving device 3 acquires the transmission characteristics obtained through the negotiation of the optical DMT signal that is the probe signal. The first determination unit 26B takes the SNR around the DC component (0 GHz) from the SNR information in the acquired transmission characteristics as a reference value. For example, the SNR 1 corresponding to the first frequency f1 of the minimum SC number 1 around the DC component (0 GHz) of the SNR information acquired by the acquisition unit 26A is taken as the reference value.

Figure 4A:
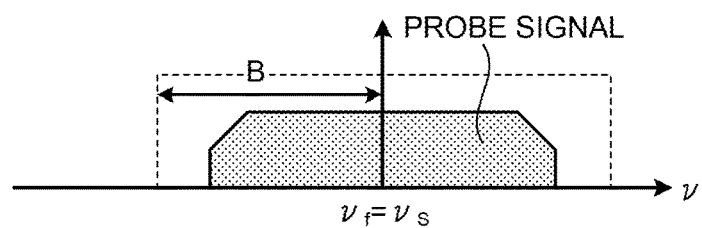
FIGS. 4A to 4D are explanatory views illustrating a process until setting of a filter frequency of the optical filter.

The first determination unit 26B determines a frequency fi corresponding to the SNRi at the time when the SNR lowers from the reference value (SNR1) by 3 dB as an offset frequency fe of the optical filter 21. FIGS. 4A to 4D are explanatory views illustrating a process until setting of a filter frequency of the optical filter 21. The horizontal axis in FIGS. 4A and 4C represents the optical frequency (wavelength) v and the horizontal axis in FIGS. 4A and 4C represents the frequency of an electronic signal after reception of the optical DMT signal. The characteristics represented in FIG. 4A are the filter characteristics of the optical filter 21, where the transmission band of the optical filter 21 is 2B (B+B), the center optical frequency (center wavelength) of the optical filter 21 is vf, and the center optical frequency (center wavelength) of the optical DMT signal is vs. In this case, the center optical frequency vf of the optical filter 21 is aligned with the center optical frequency vs of the optical DMT signal.

Figure 4B:
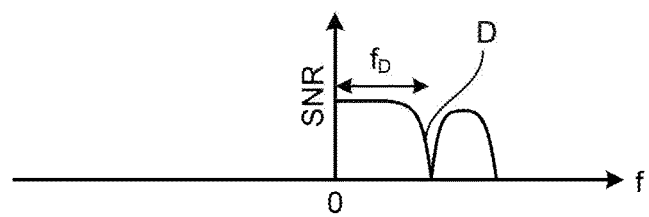
Figure 4C:
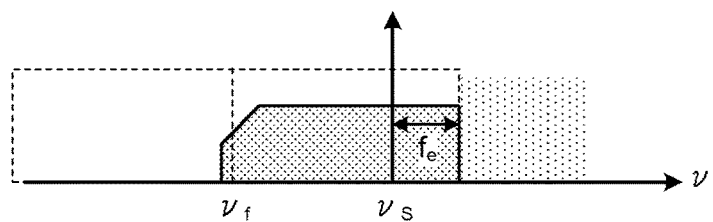
Figure 4D:
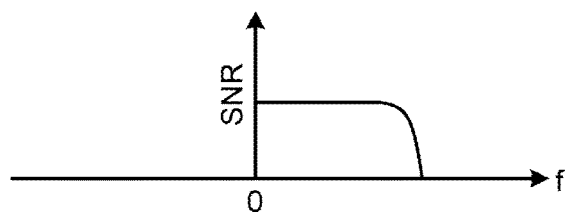

As illustrated in FIG. 4B, a dip D occurs in the transmission characteristics of the optical DMT signal. As described above, the first determination unit 26B determines the frequency at the time when the SNR lowers from the reference value by 3 dB as an offset frequency fe. The filter setting unit 25 then shifts the center optical frequency vf in order to shift the filter frequency of the optical filter such that the determined offset frequency fe serves as the edge frequency of the transmission band of the optical filter 21. As a result, as illustrated in FIG. 4D, the high-frequency band after the offset frequency is removed so that the dip D can be removed.

The controller 14 in the sending device 2 and the controller 26 in the receiving device 3 are configured to transmit information of the transmission characteristics, the quotas, etc. via a control line 5 different from the optical path 4. Alternatively, the information of the transmission characteristics, the quotas, etc. may be contained in an optical supervisory channel (OSC) signal and the OSC signal may be transmitted via the optical transmission path 4.

Operations of the optical transmission system 1 according to the first embodiment will be described here. FIG. 5 is a flowchart illustrating exemplary processing operations of the optical transmission system 1 relating to a negotiation process. The negotiation process illustrated in FIG. 5 is a process of acquiring the transmission characteristics of an optical DMT signal that is a probe signal to be transmitted from the sending device 2 to the receiving device 3 when the system starts and, according to the acquired transmission characteristics, setting modulation levels and signal power quotas corresponding to to the respective SCs.

According to FIG. 5, the sending device 2 transmits an optical DMT signal that is a probe signal to the receiving device 3 via the optical transmission path 4 (step S11). The acquisition unit 26A in the controller 26 in the receiving device 3 acquires the transmission characteristics obtained through the negotiation from the optical DMT signal that is the probe signal (step S12). Based on the offset frequency fe of the optical filter 21 that is determined from the acquired transmission characteristics, the first determination unit 26B in the controller 26 in the receiving device 3 executes a first setting process of setting a filter frequency of the optical filter 21 (step S13).

The sending device 2 then transmits the optical DMT signal that is the probe signal to the receiving device 3 via the optical transmission path 4 (step S14). The acquisition unit 26A in the receiving device 3 acquires the transmission characteristics obtained through the negotiation from the optical DMT signal that is the probe signal (step S15). The receiving device 3 notifies the sending device 2 of the acquired transmission characteristics (step S16). The sending device 2 determines modulation levels and signal power quotas corresponding to the respective SCs on the basis of the acquired transmission characteristics (step S17), sets the determined modulation levels and signal power quotas corresponding to the respective SCs in the modulator 11 (step S18), and ends the processing operations illustrated in FIG. 5.

In the negotiation process illustrated in FIG. 5, the transmission characteristics are acquired by transmitting the optical DMT signal that is the probe single between the sending device 2 and the receiving device 3 when the system starts and, based on the acquired transmission characteristics, sets the modulation levels and signal power quotas corresponding to the respective SCs in the modulator 11. As a result, even when the device characteristics, the characteristics of the optical transmission path 4, etc., deteriorate, occurrence of transmission errors can be controlled efficiently. Furthermore, this enables improvement in the frequency efficiency in the optical transmission system 1.

Figure 6:
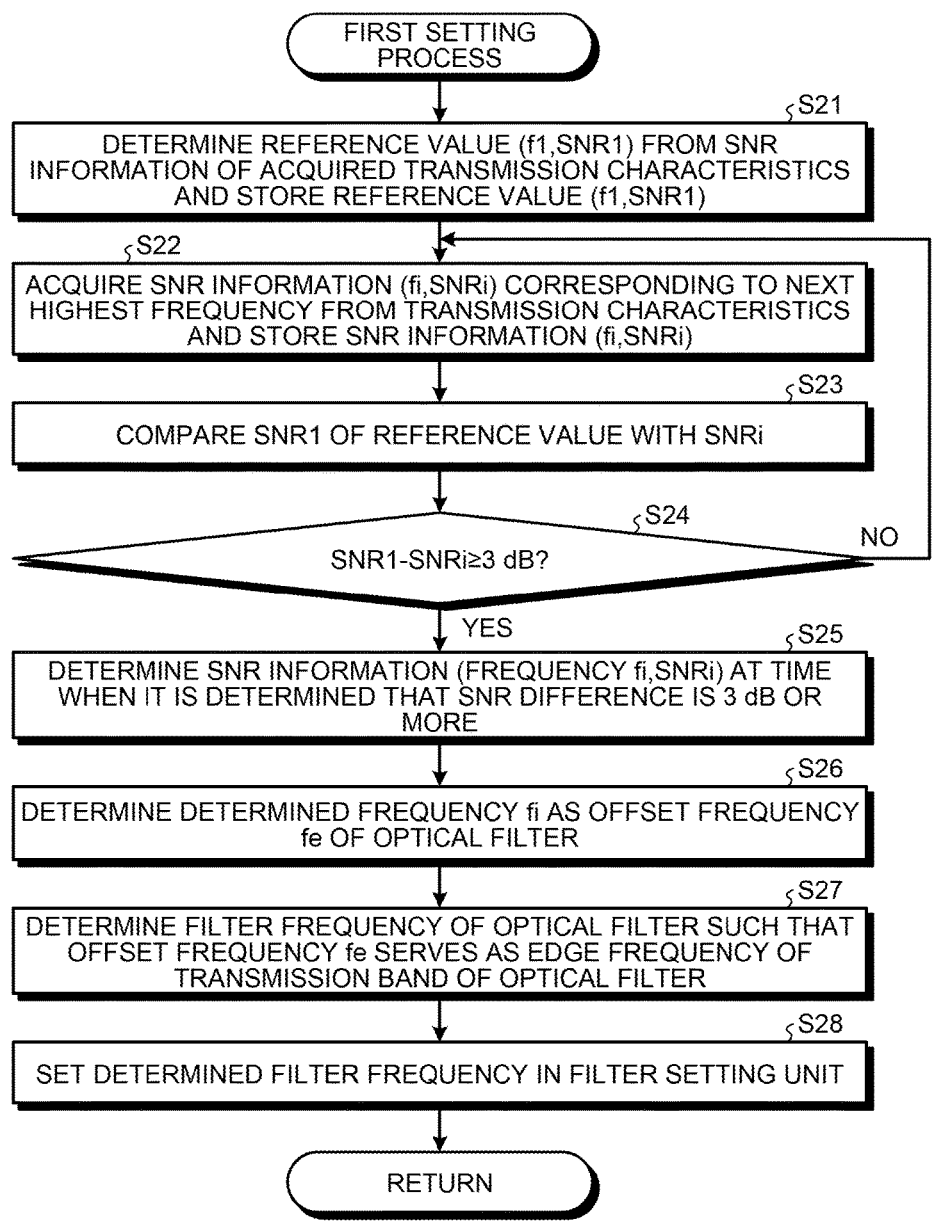
FIG. 6 is a flowchart illustrating exemplary processing operations of a controller in a receiving device relating to a first optical filter setting process.

FIG. 6 is a flowchart illustrating exemplary processing operations of the controller 26 in the receiving device 3 relating to the first setting process. The first setting process illustrated in FIG. 6 is a process of determining, based on the transmission characteristics acquired when negotiation is performed, a filter frequency of the optical filter 21 for performing VSB shaping to remove a dip occurring in the optical DMT signal.

According to FIG. 6, the acquisition unit 26A in the controller 26 in the receiving device 3 determines a reference value (f1,SNR1) from the SNR information of the acquired transmission characteristics obtained through the negotiation and stores the determined reference value (f1, SNR1) (step S21). The acquisition unit 26A extracts SNR information (fi,SNRi) corresponding to the next highest frequency from the SNR information of the transmission characteristics (step S22). The first determination unit 26B compares the extracted SNRi in the SNR information with the SNR1 that of the reference value (step S23).

The first determination unit 26B determines whether the SNR difference (SNR1−SNERi) is 3 dB or more (step S24). When the SNR difference is not 3 dB or more (NO at step S24), the acquisition unit 26A moves to step S22 in order to extract the next SNR information.

When the SNR difference is 3 dB or more (YES at step S24), the first determination unit 26B determines that the SNR has lowered from the reference value by 3 dB and determines the frequency fi in the SNR information at the time when it is determined that the SNR difference is 3 dB or more (step S25). The first determination unit 26B determines the determined frequency fi as the offset frequency fe of the optical filter 21 (step S26). The first determination unit 26B determines the filter frequency of the optical filter 21 such that the determined offset frequency fe serves as the edge frequency of the transmission band of the optical filter 21 (step S27). The first determination unit 26B sets the determined filter frequency of the optical filter 21 in the filter setting unit 25 (step S28) and ends the processing operations illustrated in FIG. 6. Accordingly, the filter setting unit 25 sets the set filter frequency in the optical filter 21.

Figure 7:
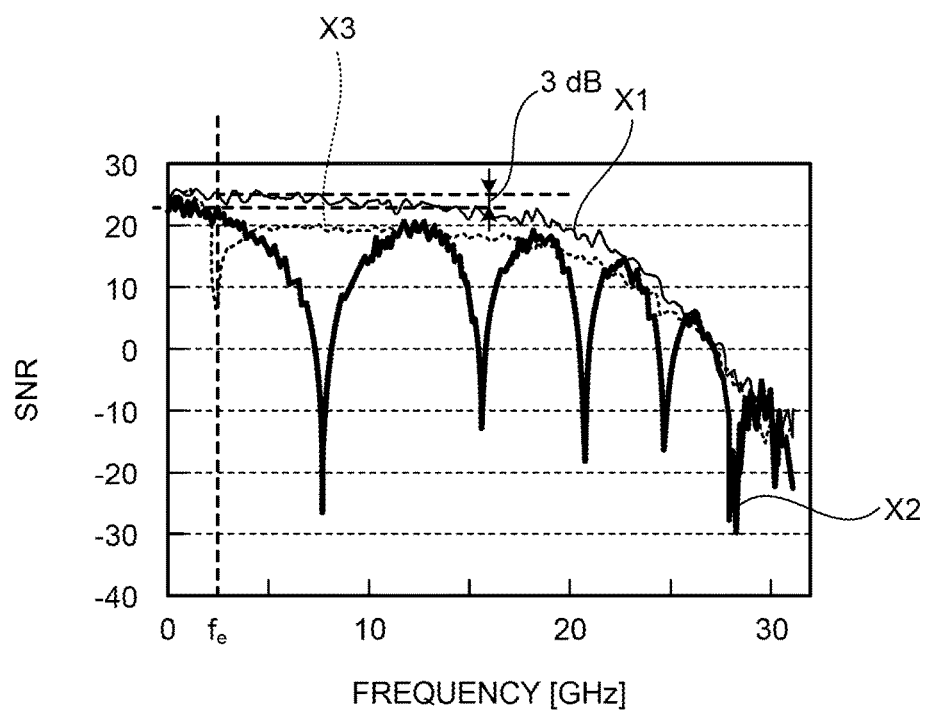
FIG. 7 is an explanatory view illustrating exemplary transmission characteristics (SNR to allocated frequency) of the optical DMT signal subjected to VSB shaping.
Figure 18:
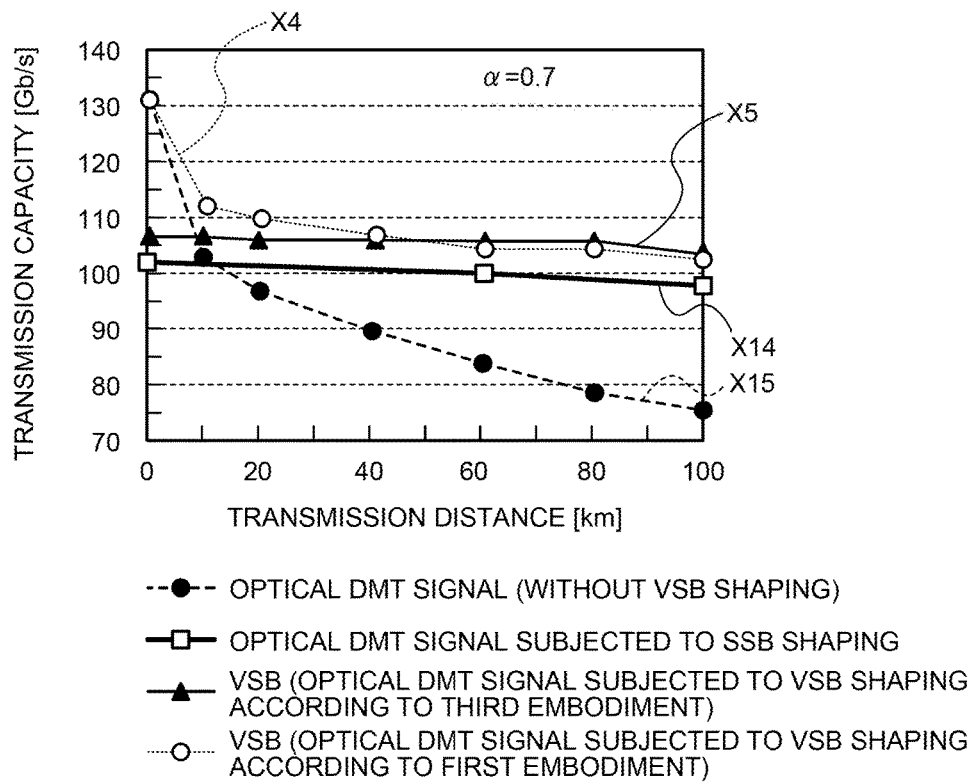
FIG. 18 is an explanatory view illustrating exemplary transmission characteristics (transmission capacity to transmission distance) of the optical DMT signal subjected to VSB shaping according to the first and third embodiments.
Figure 19:
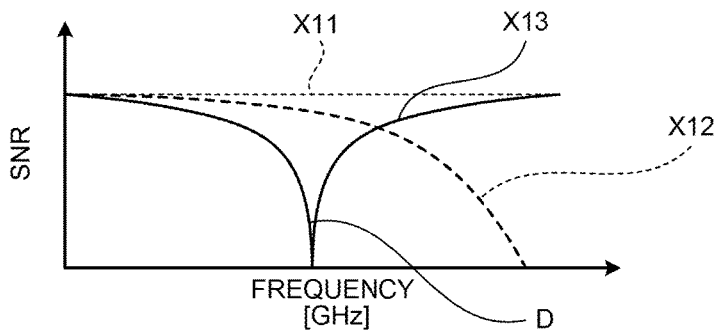
FIG. 19 is an explanatory view illustrating transmission characteristics relating to an optical DMT signal in which a dip occurs.
Figure 20:
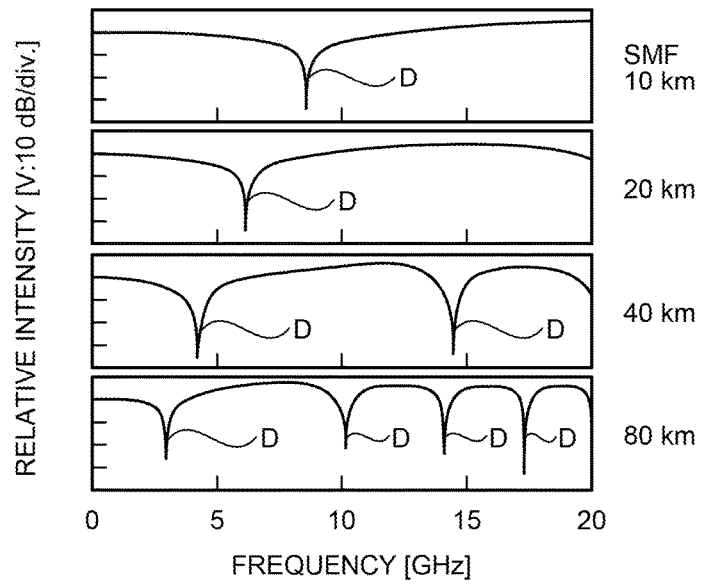
FIG. 20 is an explanatory view illustrating exemplary occurrence of a dip relating to the optical DMT signal according to each transmission distance.
Figure 21:
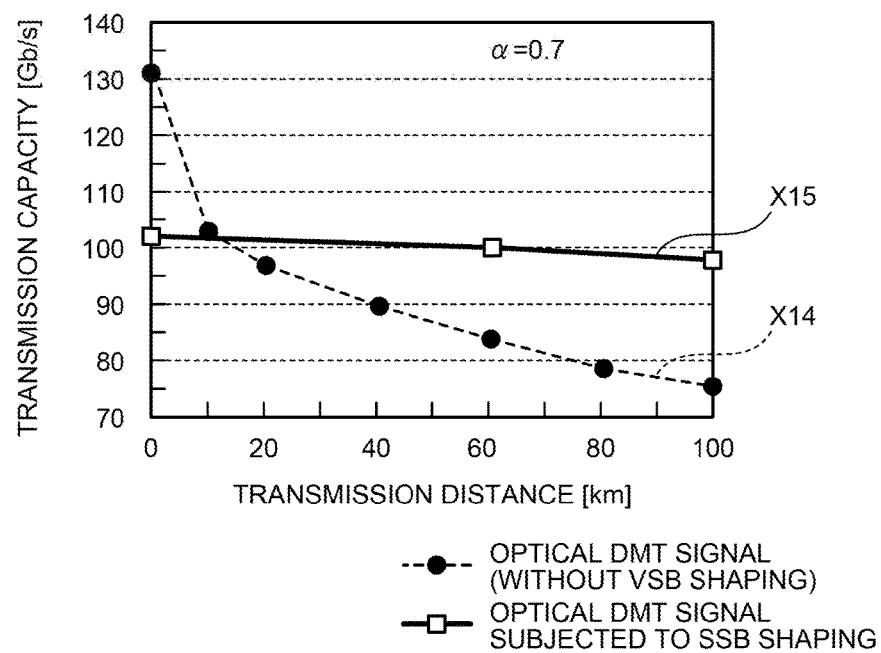
FIG. 21 is an explanatory view illustrating exemplary transmission characteristics (transmission capacity to transmission distance) of an optical DMT signal.

On the basis of the set filter frequency, the receiving device 3 acquires the optical DMT signal subjected to the VSB shaping through the optical filter 21. FIG. 7 is an explanatory view illustrating exemplary transmission characteristics of the optical DMT signal subjected to VSB shaping. The transmission characteristics X3 illustrated in FIG. 7 are the transmission characteristics of the optical DMT signal subjected to the VSB shaping. The effect of dip can be reduced in the transmission characteristics X3 compared to the transmission characteristics X2 of the optical DMT signal not subjected to VSB shaping, which reduces deterioration of the transmission characteristics. In other words, in the case where the transmission capacity is 100 Gbps in the 1.5 μm band, while the transmission limit in the transmission characteristics X2 is about 10 km, the transmission limit in the transmission characteristics X3 is 100 km. An exemplary relation between the transmission capacity and transmission distance is illustrated in FIG. 18.

Based on the transmission characteristics of the optical DMT signal, which are obtained through the negotiation, the receiving device 3 according to the embodiment can set a filter frequency of the optical filter 21 such that the dip can be removed from the optical DMT signal and obtain the optical DMT signal subjected to VSB shaping with the optical filter 21. Accordingly, the receiving device 3 can remove the dip from the high-frequency band of the optical DMT signal, which reduces deterioration of the transmission characteristics.

On the basis of the SNR corresponding to each allocated frequency from the SNR information of the transmission characteristics, the receiving device 3 determines the allocated frequency corresponding to the SNR having lowered from the reference value (SNR1) by 3 dB. Furthermore, the receiving device 3 actively determines a filter frequency of the optical filter 21 such that the determined allocated frequency serves as the edge frequency of the transmission band of the optical filter 21. Accordingly, the receiving device 3 can remove the dip from the high-frequency band of the optical DMT signal, which reduces deterioration of the transmission characteristics.

Furthermore, the receiving device 3 acquires SNR information by using the transmission characteristics obtained through the negotiation and unique to DMT and, based on the SNR information, sets a filter frequency of the optical filter 21 to remove the dip from the optical DMT signal. Accordingly, the dip can be removed from the optical DMT signal, which reduces deterioration of the transmission characteristics of the optical DMT signal.

While, the SNR of an optical DMT signal in which a dip occurs lowers by more than 3 dB compared to a B to B optical DMT signal, the SNR of the optical DMT signal subjected to VSB shaping lowers by only 3 dB at maximum, which reduces deterioration of the transmission characteristics compared to the case where the VSB shaping is not performed.

The receiving device 3 incorporates the optical filter 21, the acquisition unit 26A, and the first determination unit 26B and thus the offset frequency fe of the optical filter 21 can be determined without the control line 5, which shortens the processing time required to determine the offset frequency fe.

According to the first embodiment, the reference value is the SNR1 around the DC component (0 GHz) of the AC number of 1; however, because there may be a case where noise occurs, the reference value may be set at the SNR of the frequency of an SC number, such as 2 or 3, relatively close to the DC component, i.e., the reference value may be changed as appropriate.

According to the first embodiment, the optical filter 21 and the filter setting unit 25 are incorporated in the receiving device 3. Alternatively, the optical filter 21 and the filter setting unit 25 may be incorporated in the sending device 2. Such a case will be described below as a second embodiment of the present invention.

[b] Second Embodiment

Figure 8:
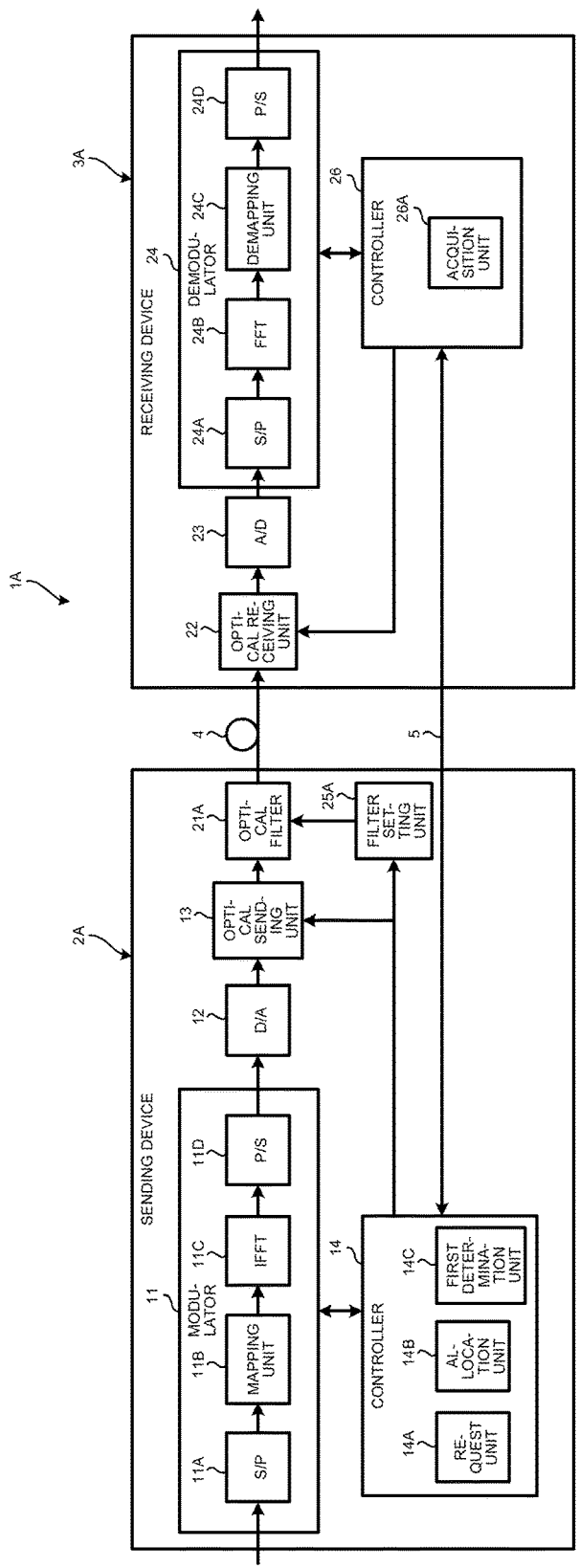
FIG. 8 is an explanatory view illustrating an exemplary optical transmission system according to a second embodiment of the present invention.

FIG. 8 is an explanatory view illustrating an optical transmission system 1A according to the second embodiment. By denoting the same components as those of the optical transmission system 1 illustrated in FIG. 1 with the same reference numerals as those used in FIG. 1, redundant descriptions of the components and operations will be omitted below.

A receiving device 3A illustrated in FIG. 8 includes the optical receiving unit 22, the demodulator 24, and the controller 26. The sending device 2A includes an optical filter 21A and a filter setting unit 25A in addition to the modulator 11, the D/A 12, the optical sending unit 13, and the controller 14. Furthermore, the controller 14 includes a first determination unit 14C that executes the first setting process.

The first determination unit 14C in the controller 14 in the sending device 2A receives the transmission characteristics of an optical DMT signal that is a probe signal from the receiving device 3A and, on the basis of the received transmission characteristics, executes the first setting process illustrated in FIG. 6. The first determination unit 14C determines a filter frequency of the optical filter 21A in the first setting process. The first determination unit 14C notifies the filter setting unit 25A of the determined filter frequency. The filter setting unit 25A sets the filter frequency in the optical filter 21A. Accordingly, the optical filter 21A performs VBS shaping on the optical DMT signal according to the set filter frequency and transmits the optical DMT signal subjected to VSB shaping to the receiving device 3A via the optical transmission path 4. In the transmission characteristics X3 of the optical DMT signal subjected to VSB shaping, the effect of the dip D can be reduced compared to the transmission characteristics X2 of the optical DMT signal not subjected to VSB shaping, which reduces deterioration of the transmission characteristics.

The sending device 2A according to the second embodiment acquires the transmission characteristics obtained through the negotiation of the optical DMT signal from the receiving device 3A and, according to the transmission characteristics, sets a filter frequency of the optical filter 21 such that the dip is removed from the optical DMT signal. The sending device 2A can then obtain the optical DMT signal subjected to VSP shaping with the optical filter 21A. Accordingly, the sending device 2A can remove the dip from the high-frequency band of the optical DMT signal, which enables reduction of deterioration of the transmission characteristics.

Based on the SNR corresponding to each allocated frequency from the SNR information of the transmission characteristics, the sending device 2A determines the allocated frequency corresponding to the SNR having lowered from the reference value (SNR1) by 3 dB. Furthermore, the sending device 2A actively determines the filter frequency of the optical filter 21A such that the determined allocated frequency serves as the edge frequency of the transmission band of the optical filter 21. Accordingly, the sending device 2A can remove the dip from the high-frequency band of the optical DMT signal, which reduces deterioration of the transmission characteristics.

Furthermore, the sending device 2A acquires the SNR information by using the transmission characteristics obtained through the negotiation and unique to DMT and, based on the SNR information, sets a filter frequency of the optical filter 21 to remove the dip from the optical DMT signal. As a result, the dip can be removed from the optical DMT signal, which reduces deterioration of the transmission characteristics of the optical DMT signal.

Because the sending device 2A incorporates the optical filter 21A, the sending device 2A transmits the optical DMT signal with almost halved modulated components and thus the non-linear optical effects occurring depending on the signal power can be reduced. Furthermore, the optical filter 21A may be combined with the optical sending unit 13 into a module.

According to the first and second embodiments, the frequency fe corresponding to the SNR having lowered from the reference value by 3 dB is determined as the offset frequency of the optical filter 21 (21A). Furthermore, the filter frequency of the optical filter 21 (21A) is determined such that the offset frequency serves as the edge frequency of the transmission band of the optical filter 21 (21A); however, another method may be employed as a method of removing a dip from an optical DMT signal. This case will be described below as a third embodiment of the present inventions.

[c] Third Embodiment

Figure 9:
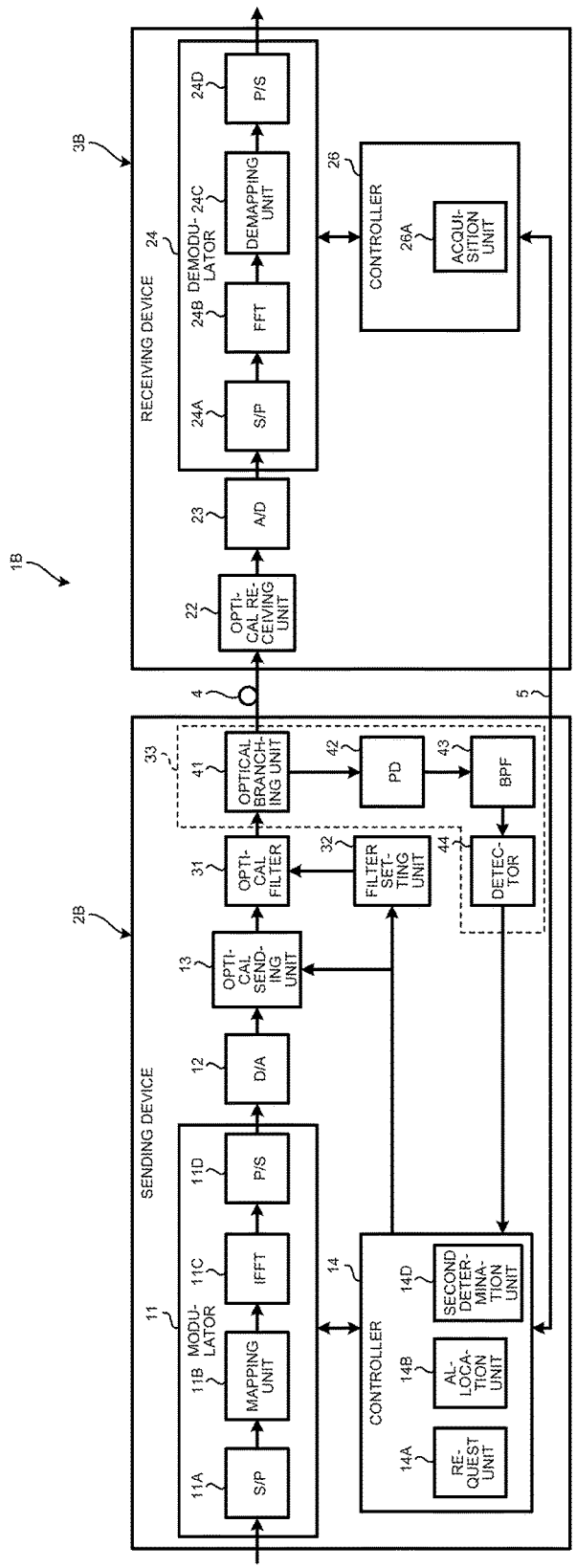
FIG. 9 is an explanatory view illustrating an exemplary optical transmission system according to a third embodiment of the present invention.

FIG. 9 is an explanatory view illustrating an exemplary optical transmission system 1B according to the third embodiment. By denoting the same components as those of the optical transmission system illustrated in FIG. 1 with the same reference numerals as those used in FIG. 1, redundant descriptions of the components and operations will be omitted below.

The optical transmission system 1B is different from the optical transmission system 1 illustrated in FIG. 1 in the internal configurations of the sending device 2B and a receiving device 3B. The receiving device 3B includes the A/D 23, the demodulator 24, and the controller 26. The optical receiving unit 22 receives an optical DMT signal that is a probe signal from the optical transmission path 4, performs electrical conversion on the received optical DMT signal, and outputs the electrical DMT signal. The A/D 23 performs digital conversion on the DMT signal from the optical receiving unit 22. The demodulator 24 demodulates and outputs the digital DMT signal. The acquisition unit 26A in the controller 26 acquires the transmission characteristics obtained through the negotiation of the optical DMT signal that is the probe signal and is demodulated by the demodulator 24. The controller 26 notifies the controller 14 in the sending device 2B of the acquired transmission characteristics via the control line.

The sending device 2B includes an optical filter 31, a filter setting unit 32, and a filter controller 33 in addition to the modulator 11, the D/A 12, the optical sending unit 13, and the controller 14. The optical filter 31 is a filter that performs VSB shaping on the optical DMT signal from the optical sending unit 13. The filter setting unit 32 sets a filter frequency in the optical filter 31 such that the high-frequency components after an asymptotic value, which will be described below, are removed. The filter controller 33 includes an optical branching unit 41, a PD 42, a band pass filter (BPF) 43, and a detector 44. The optical branching unit 41 optically branches the optical DMT signal subjected to the VSB shaping at the optical filter 31 into the optical path 4 and the PD 42. The PD 42 is a photodiode that performs electrical conversion on the optical DMT signal subjected to VSB shaping and optically branched by the optical branching unit 41. The BPF 43 is a filter that extracts a dip D1 unique to signals subjected to VSB shaping, such as a signal component having a frequency of around, for example, 2 GHz.

Figure 10:
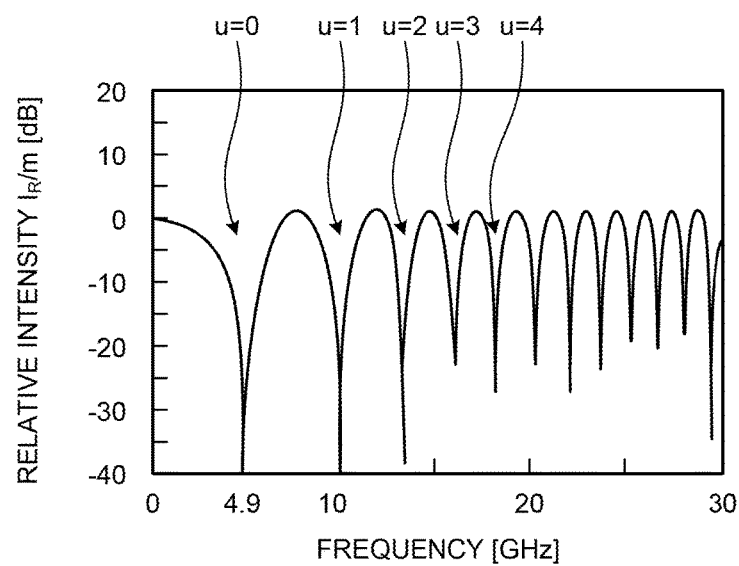
FIG. 10 is an explanatory view illustrating exemplary transmission characteristics (relative intensity to allocated frequency) of the optical DMT signal in the case where the transmission distance is 100 km.
Figure 11:
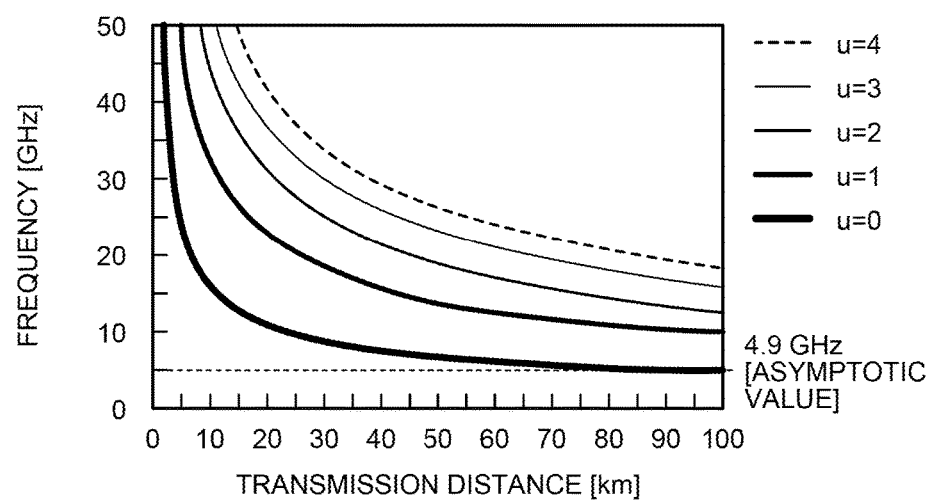
FIG. 11 is an explanatory view illustrating an exemplary relation between the frequency of each dip occurring in the optical DMT signal represented in FIG. 10 and the transmission distance.

The asymptotic value will be described here. FIG. 10 is an explanatory view illustrating exemplary transmission characteristics (SNR to allocated frequency) of an optical DMT signal in the case where the transmission distance is 100 km. In the transmission characteristics illustrated in FIG. 10, when the transmission distance is 100 km and the chirp a of the optical sending unit 13 is 0.7, dips u0, u1, u2, u3, u4, . . . occur in the order they appear in this sentence. As a result, the relative intensity of the optical DMT signal significantly lowers in accordance with the occurrence of the dips. FIG. 11 is an explanatory view illustrating an exemplary relation between the frequency of each dip occurring in the optical DMT signal represented in FIG. 10 and the transmission distance. It will be understood that, while the frequency at which each of the dips u0, u1, u2, u3, and u4 represented in FIG. 10 occurs lowers as the transmission distance increases, no dip occurs at 4.9 GHz or lower. The frequency at which and after which no dip occurs, for example, 4.9 GHz is taken as the asymptotic value.

Figure 12:
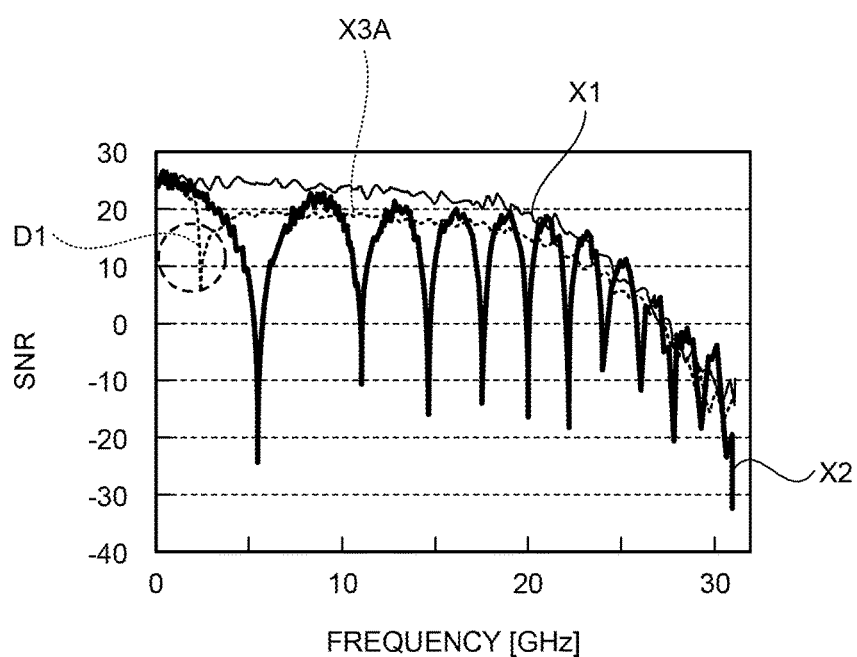
FIG. 12 is an explanatory view illustrating exemplary transmission characteristics (SNR to allocated frequency) of the optical DMT signal subjected to VSB shaping.

The filter frequency of the optical filter 31 is set in advance such that the edge frequency of the transmission band of the optical filter 31 is at the asymptotic value of 4.9 GHz or lower. Furthermore, the filter frequency of the BPF 43 is set at a frequency around the unique dip D after VSB shaping, for example, around 2 GHz. FIG. 12 is an explanatory view illustrating exemplary transmission characteristics (SNR to allocated frequency) of the optical DMT signal subjected to VSB shaping. The transmission characteristics X3A illustrated in FIG. 12 are transmission characteristics of the optical DMT signal subjected to VSB shaping. In the transmission characteristics X3A, the effect of dip can be reduced compared to the transmission characteristics X2 of the optical DMT signal not subjected to VSB shaping, which reduces deterioration of the transmission characteristics; however, the unique dip D1 due to VSB shaping occurs around 2 GHz in the transmission characteristics X3A. Not that the unique dip D1 occurs in, for example, the cut-off obliqueness of the optical filter 31 or the line width of the LD in the optical sending unit 13. The characteristics that the unique dip D1 locally lowers the power are used to make a setting in the optical filter 31 as described below.

Figure 13:
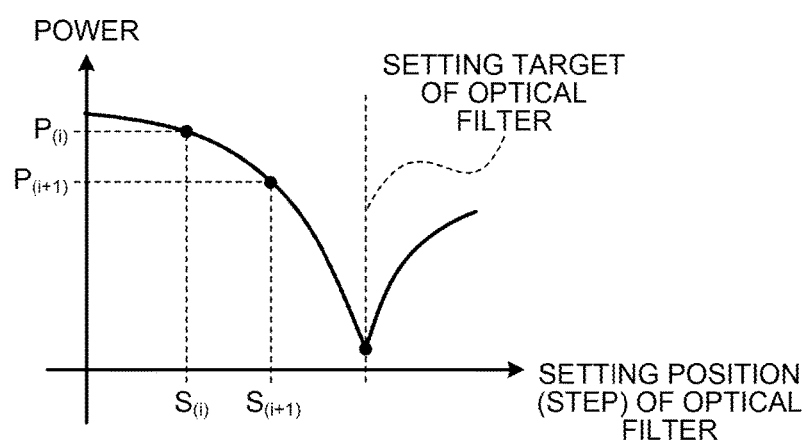
FIG. 13 is an explanatory view illustrating an exemplary method of acquiring an offset frequency of the optical filter.

The detector 44 converts the signal component of the frequency around 2 GHz extracted by the BPF 43 to power and detects the power. FIG. 13 is an explanatory view illustrating an exemplary method of acquiring an offset frequency of the optical filter 31.

The controller 14 in the sending device 2B includes a second determination unit 14D in addition to the request unit 14A and the allocation unit 14B. The second determination unit 14D compares the powers at adjacent previous and following steps of the signal components of frequencies detected by the detector 44. As illustrated in FIG. 13, the second determination unit 14D compares the power P(i) of the previous step S and the power P(i+1) of the following step S(i+1). The second determination unit 14D determines a step position of the optical filter 31 at which the power difference of (power P(i)−power P(i+1) is 0. The step position corresponds to the number of steps for shifting the filter frequency of the optical filter 31 stepwise.

The second determination unit 14D determines the a filter frequency of the optical filter 31 such that the offset frequency serves as the edge frequency of the transmission band of the optical filter 31 at the determined step position.

Furthermore, the second determination unit 14D sets the determined filter frequency in the filter setting unit 32.

Figure 14:
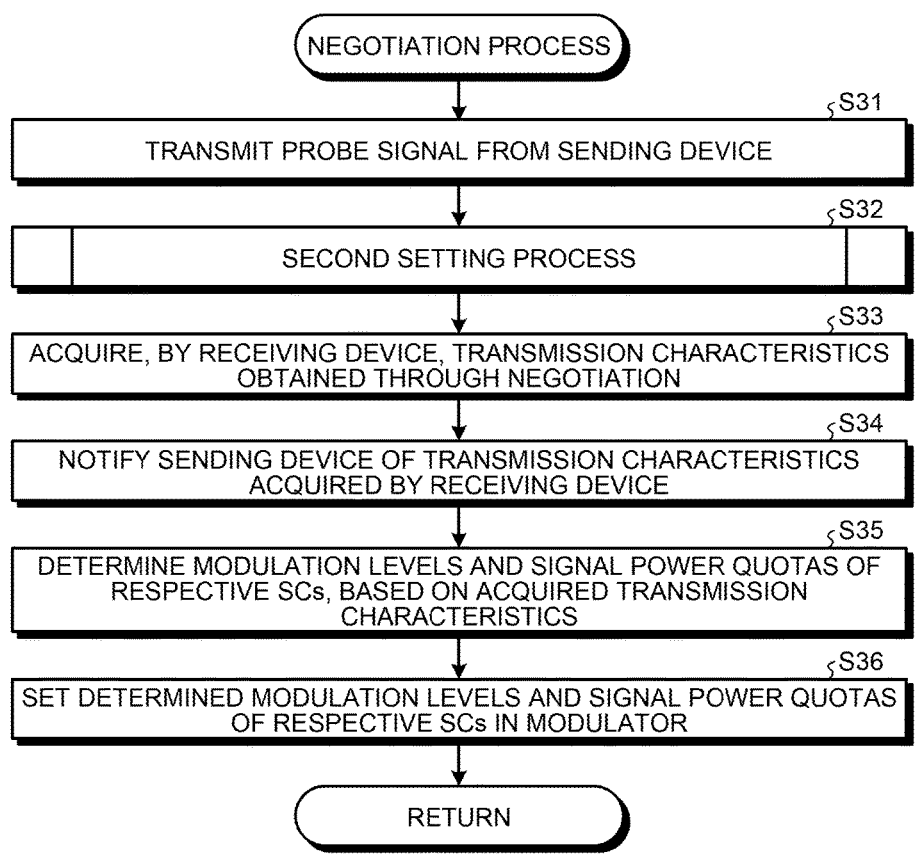
FIG. 14 is a flowchart illustrating exemplary processing operations of the optical transmission system relating to the negotiation process.

The operations of the optical transmission system 1B according to the third embodiment will be described. FIG. 14 is a flowchart illustrating exemplary processing operations of the optical transmission system 1B relating to the negotiation process. According to FIG. 14, the sending device 2B transmits an optical DMT signal that is a probe signal to the receiving device 3B (step S31). The sending device 2B optically branches the optical DMT signal that is the probe signal at the optical branching unit 41 and executes a second setting process on the optically-branched optical DMT signal (step S32).

The receiving device 3B acquires the transmission characteristics obtained through the negotiation from the optical DMT signal received from the sending device 2B via the optical transmission path 4 (step S33). The receiving device 3B notifies the sending device 2B of the acquired transmission characteristics (step S34). The sending device 2B determines modulation levels and signal power quotas corresponding to respective SCs on the basis of the acquired transmission characteristics (step S35), sets the determined modulation levels and signal power quotas corresponding to the respective SCs in the modulator 11 (step S36), and ends the processing operations illustrated in FIG. 14.

In the negotiation process illustrated in FIG. 14, the transmission characteristics are acquired by transmitting the optical DMT signal, which is the probe signal, between the sending device 2B and the receiving device 3B when the system starts and, based on the acquired transmission characteristics, sets the modulation levels and the signal power quotas corresponding to the respective SCs in the modulator 11. As a result, even when the device characteristics or the characteristics of the optical transmission path 4 deteriorate, occurrence of transmission errors can be reduced efficiently. This leads to improvement in the frequency efficiency in the optical transmission system 1B.

Figure 15:
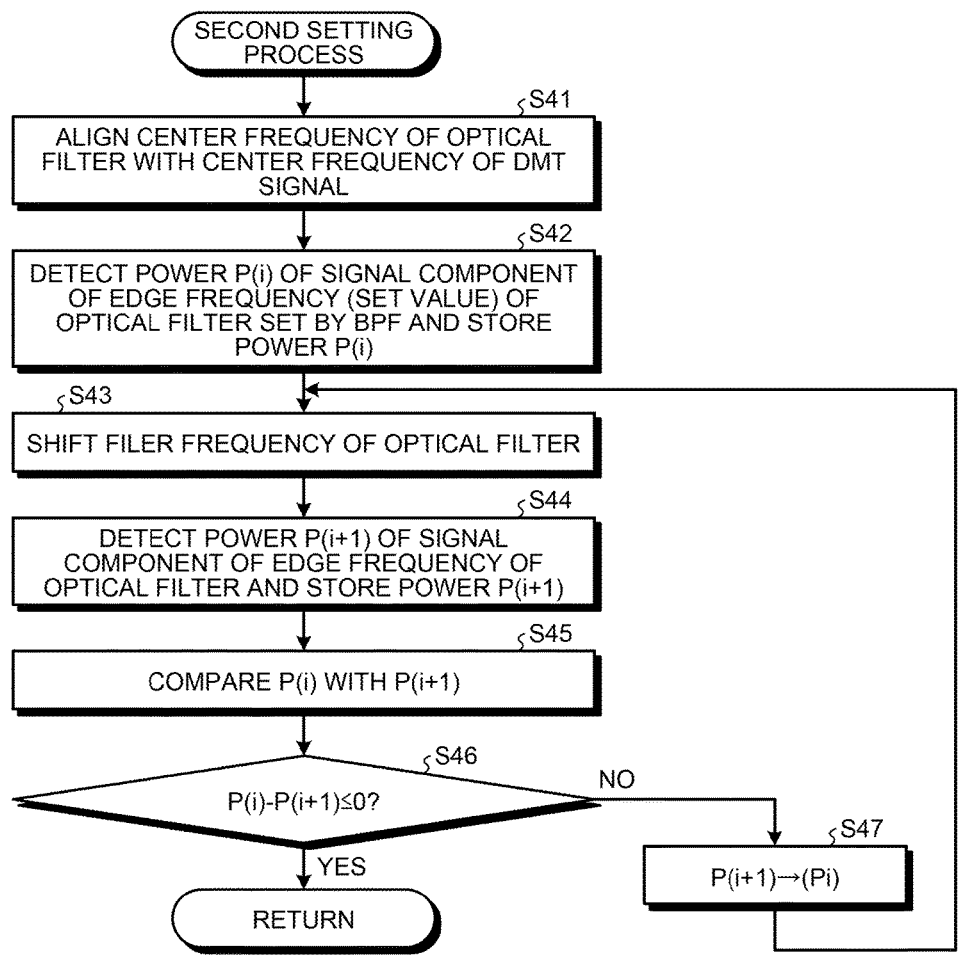
FIG. 15 is a flowchart illustrating exemplary processing operations of a controller in a sending device relating to a second optical filter setting process.

FIG. 15 is a flowchart illustrating exemplary processing operations of the controller 14 in the sending device 2B relating to the second setting process. The second setting process illustrated in FIG. 15 is the process of determining a filter frequency of the optical filter 31 by using the unique dip D1 from the optical DMT signal subjected to VSB shaping.

According to FIG. 15, the controller 14 in the sending device 2B sets the filter frequency of the optical filter 31 such that the center frequency of the transmission band of the optical filter 31 is aligned with the center frequency of the optical DMT signal (step S41).

The second determination unit 14D of the controller 14 acquires the power P(i) of the signal component that is extracted by the BPF 43 and that is set for the edge frequency of the optical filter 31 via the detector 44 and stores the power P(i) (step S42). The second determination unit 14D shifts the filter frequency of the optical filter 31 by a predetermined amount in a certain frequency direction (the direction toward higher frequencies or lower frequencies) and sets the step corresponding to the shifted filter frequency in the filter setting unit 32 (step S43).

The second determination unit 14D acquires the power P(i+1) of the signal component of the edge frequency of the optical filter 31 via the detector 44 and stores the power P(i+1) (step S44). The second determination unit 14D compares the powers P(i) and P(i+1) of the signal components of the stored previous and following frequencies (step S45).

Based on the result of the comparison, the second determination unit 14D determines whether the power difference (P(i)−P(i+1)) between the signal components of the previous and following frequencies is 0 or lower (step S46). When the power difference between the signal components of the previous and following frequencies is neither 0 nor lower (NO at step S46), the second determination unit 14D updates the stored power P(i+1) to the power P(i) (step S47). The second determination unit 14D moves to step S43 in order to shift the filter frequency of the optical filter 31 so as to obtain the power P(i+1) of the next frequency component.

When the power difference between the signal components of the previous and following frequencies is 0 or lower (YES at S46), the second determination unit 14D ends the processing operations illustrated in FIG. 15 while maintaining the step corresponding to the filter frequency that is currently set.

In the second setting process illustrated in FIG. 15, because the local minimum power value due to the unique dip D1 is used to set a filter frequency such that the edge of the optical filter 31 is at the minimum value, the filter controller 33 has a simple configuration without demodulation processing on the DMT signal by the demodulator 24.

The sending device 2B according to the third embodiment sets a filter frequency of the optical filter 31 such that the frequency of the asymptotic value at and from which no dip occurs in accordance with increase in the transmission distance serves as the edge frequency of the transmission band of the optical filter 31. Furthermore, the sending device 2B determines the set frequency of the optical filter 31 by using the unique dip D1 that occurs in the optical DMT signal transmitted through the optical filter 31 and subjected to VSB shaping. As a result, the dip D occurring in the optical DMT signal before VSB shaping can be removed, which reduces deterioration of the transmission characteristics of the optical DMT signal.

The sending device 2B refers to the signal power corresponding to the SNR of each step corresponding to the allocated frequency in the transmission characteristics obtained through the negotiation and acquired from the receiving device 3B. The sending device 2B determines the step of the optical filter 31 such that the frequency of the unique dip D1 occurring in the optical DMT signal transmitted through the optical filter 31 serves as the edge frequency of the transmission band of the optical filter 31.

Because the optical DMT signal is subjected to VSB shaping with the asymptotic value, the transmission characteristics are flat compared to the case where the filter frequency is dynamically changed according to the frequency at which the dip occurs in the optical DMT signal according to the first embodiment. As a result, the processing of allocating the modulation levels and the signal powers according to the transmission characteristics of the optical DMT signal can be reduced.

Because the sending device 2B incorporates the optical filter 31 and the filter controller 33, a closed filter setting in the sending device 2B can be made without acquiring the transmission characteristics from the receiving device 3B.

According to the third embodiment, the sending device 2B incorporates the optical filter 31, the filter setting unit 32, and the filter controller 33. Alternatively, not the sending device 2B, but the receiving device 3B may incorporate the optical filter 31, the filter setting unit 32, and the filter controller 33. This case will be described below as a fourth embodiment of the present invention.

[d] Fourth Embodiment

Figure 16:
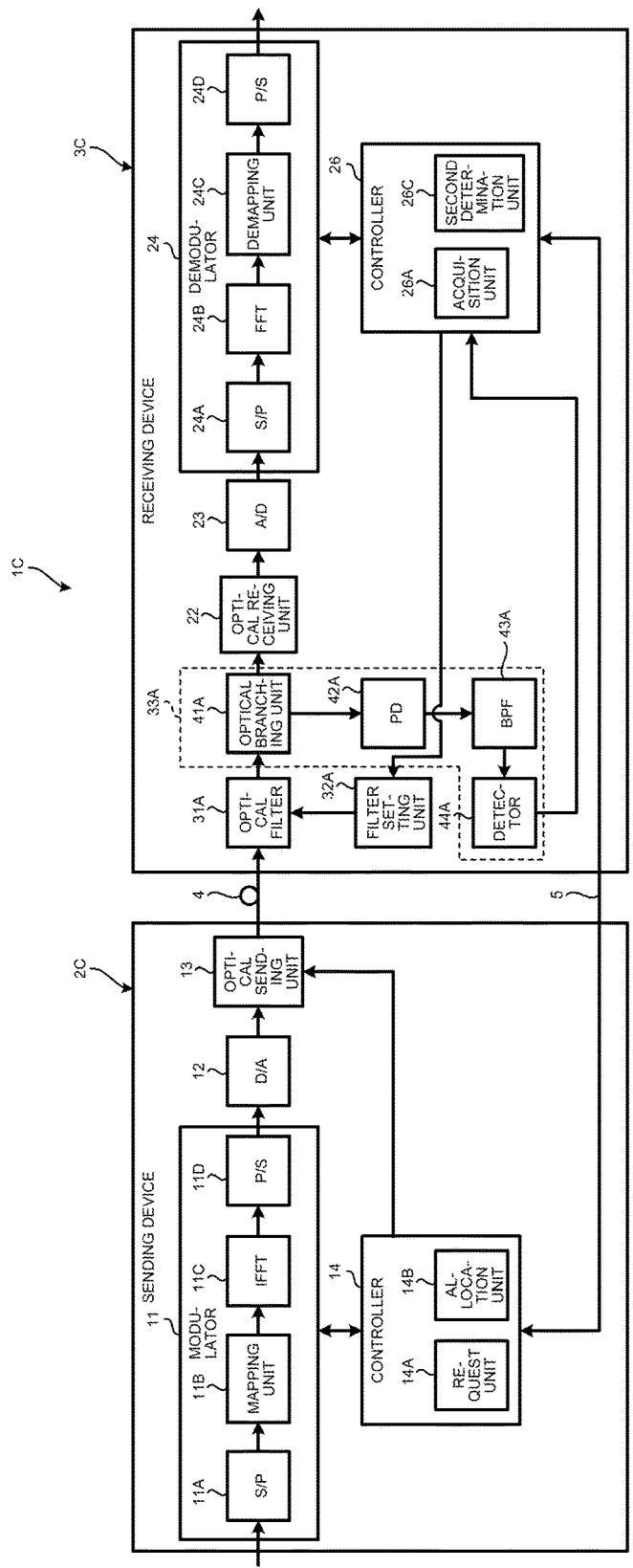
FIG. 16 is an explanatory view illustrating an exemplary optical transmission system according to a fourth embodiment of the present invention.

FIG. 16 is an explanatory view illustrating an exemplary optical transmission system 1C according to the fourth embodiment. By denoting the same components as those of the optical transmission system 1B illustrated in FIG. 9 with the same reference numerals as those used in FIG. 9, redundant descriptions of the components and operations will be omitted below.

The optical transmission system 1C illustrated in FIG. 16 is different from the optical transmission system 1B illustrated in FIG. 9 in that the optical transmission system 1C incorporates an optical filter 31A, a filter setting unit 32A, and a filter controller 33A.

A sending device 2C transmits an optical DMT signal that is a probe signal to a receiving device 3C via the optical transmission path 4. The filter setting unit 32A in the receiving device 3C sets a filter frequency in the optical filter 31A such that the edge frequency of the transmission band of the optical filter 31A is at the asymptotic value.

The optical filter 31A perform VSB shaping on the optical DMT signal from the optical transmission path 4. The filter setting unit 32A sets the filter frequency for removing the high-frequency components at and after the asymptotic value in the optical filter 31. The filter controller 33A includes an optical branching unit 41A, a PD 42A, a BPF 43A, and a detector 44A. The optical branching unit 41A optically branches the optical DMT signal subjected to VSB shaping with the asymptotic value into the optical receiving unit 22 and the PD 42A. The PD 42A performs electrical conversion on the optical DMT signal subjected to the VSB shaping with the asymptotic value with which the optical branching has been performed. The BPF 43A extracts the signal component of the frequency around the unique dip D1, for example, around 2 GHz, from the electrical DMT signal. The detector 44A converts the extracted signal component of the frequency around the unique dip D1 to power and detects the power.

The controller 26 in the receiving device 3C includes a second determination unit 26C in addition to the acquisition unit 26A. The second determination unit 26C compares the powers of the adjacent previous and following steps of the signal components of the respective frequencies detected by the detector 44A. As illustrated in FIG. 13, the second determination unit 26C compares the power P(i) of the previous step S and the power P(i+1) of the following step S(i+1). When the power difference of (power P(i)−power P(i+1)) is neither 0 nor lower, the second determination unit 26C maintains the step of the optical filter 31A. When the power difference is 0 or lower, the second determination unit 26C ends controlling the optical filter 31A and determines a step position of the optical filter 31A. Note that the step position corresponds to the number of steps for shifting the filter frequency of the optical filter 31A stepwise.

The second determination unit 26C determines the filter frequency of the optical filter 31A such that the offset frequency servers as the edge frequency of the transmission band of the optical filter 31A at the determined step position. Furthermore, the second determination unit 26C sets the determined filter frequency in the filter setting unit 32A.

The operations of the optical transmission system 1C according to the fourth embodiment will be described below. The controller 26 in the receiving device 3C sets a filter frequency of the optical filter 31A such that the center frequency of the transmission band of the optical filter 31A is aligned with the center frequency of the optical DMT signal.

The second determination unit 26C of the controller 26 acquires the power P(i) of a signal component extracted by the BPF 43A, which is the power set for the edge frequency of the optical filter 31A, via the detector 44A and stores the power P(i). The second determination unit 26C shifts the filter frequency of the optical filter 31A by a predetermined amount in a certain frequency direction (the direction toward higher frequencies or lower frequencies) and sets the shifted filter frequency in the filter setting unit 32A.

The second determination unit 26C acquires the power P(i+1) of the signal component of the edge frequency of the optical filter 31A via the detector 44A and stores the power P(i+1). The second determination unit 26C compares the stored powers P(i) and P(i+1) of the signal components of the previous and following frequencies.

Based on the result of the comparison, the second determination unit 26C determines whether the power difference (P(i)−P(i+1)) between the signal components of the previous and following frequencies is 0 or lower. When the power difference between the signal components of the previous and following frequencies is neither 0 nor lower, the second determination unit 26C updates the stored power P(i+1) to the power P(i) and shifts the filter frequency of the optical filter 31A in order to acquire the power P(i+1) of the next frequency component.

When the power difference between the signal components of the previous and following frequencies is 0 or lower, the second determination unit 26C ends the processing operations while maintaining the step corresponding to the filter frequency that is currently set.

Because the controller 26 uses the local minimum power value die to the unique dip D1 to set the filter frequency such that the edge of the optical filter 31A is at the minimum value, the filter controller 33 has a simple configuration without demodulation processing on the DMT signal by the demodulator 24.

The receiving device 3C according to the fourth embodiment sets the filter frequency of the optical filter 31A such that the frequency of the asymptotic value at and from which the dip D does not occur in accordance with increase in the transmission distance serves as the edge frequency of the transmission band of the optical filter 31A. As a result, the dip D occurring in the optical DMT signal not subjected to VSB shaping can be removed, which reduces deterioration of the transmission characteristics of the optical DMT signal.

The receiving device 3C refers to the signal power corresponding to the SNR of each step corresponding to the allocated frequency in the acquired transmission characteristics obtained through the negotiation. The receiving device 3C determines the step of the optical filter 31A such that the frequency of the unique dip D1 occurring in the optical DMT signal transmitted through the optical filter 31A serves as the edge frequency of the transmission band of the optical filter 31A.

Because the optical DMT signal is subjected to VSB shaping with the asymptotic value, the transmission characteristics are flat compared to the case where the filter frequency is dynamically changed according to the frequency at which the dip occurs in the optical DMT signal according to the first embodiment. As a result, the processing of allocating the modulation levels and the signal powers according to the transmission characteristics of the optical DMT signal can be reduced.

Because the receiving device 3C incorporates the optical filter 31A and the filter controller 33A, a closed filter setting in the sending device 2B can be made.

According to the third and fourth embodiments, the filter frequency of the optical filter 31 (31A) is adjusted stepwise according to the steps. Alternatively, the filter frequency may be adjusted continuously according to the frequencies.

FIG. 17 is an explanatory view illustrating a comparative example of various dispersion compensation systems used to avoid deterioration of the transmission characteristics due to dispersion. As for the dispersion compensating fiber (DCF) system, the signal loss is large, the circuit structure is simple, the amount of compensation is fixed, the signal delay is large, the system can be set in a sending device or a receiving device, and the system is applicable to wavelength division multiplexing (WDM) signals. As for the virtually imaged phased array (VIPA) system, the signal loss is large, the circuit structure is complicated, the amount of compensation is variable, the signal delay is small, and the system can be set in a sending device or a receiving device. As for the fiber bragg grating (FBG) system, the signal loss is small, the circuit structure is simple, the amount of compensation is fixed, the signal delay is small, the system can be set in a sending device or a receiving device, and the system is applicable to WDM signals. As for the optical phase conjugation (OPC) system, the signal loss is large, the circuit structure is complicated, the amount of compensation is fixed, the signal delay is medium, the system can be set in a relay device, and the system is applicable to WDM signals. As for the optical Fourier transform (OFT) system, the signal loss is large, the circuit structure is complicated, any amount of compensation is used, the signal delay is medium, and the system can be set in a receiving device. As for the single side band (SSB) phase shift system, the signal loss is large, the circuit structure is complicated, any amount of compensation is used, the signal delay is small, and the system can be set in a sending device or a receiving device. As for the single side band (SSB) filter system, the signal loss is small, the circuit structure is simple, any amount of compensation is used, the signal delay is small, the system can be set in a sending device or a receiving device, and the system can be applied to WDM by using a wavelength circulative filter, such as an arrayed waveguide grating (AWG) or an interleaver (IL). When the SSB filter system is employed, the dip in the optical DMT signal can be removed by SSB shaping for removing any one of the upper band or the lower band of the optical DMT signal. As for the vestigial side band (VSB) filter system, the signal loss is small, the circuit structure is simple, any amount of compensation is used, the signal delay is small, the system can be set in a sending device or a receiving device, and the system can be applied to WDM by using an AWG or IL. Note that the VSB filter system is the dispersion compensation system used for the embodiments.

FIG. 18 is an explanatory view illustrating exemplary transmission characteristics (transmission capacity to transmission distance) of the optical DMT signal according to the first and third embodiments. The transmission characteristics X15 represented in FIG. 18 are the transmission characteristics of the optical DMT signal subjected to SSB shaping. In the transmission characteristics X15, even when the transmission distance varies, the transmission capacity is stable at about 102 Gbps. However, SSB shaping requires sharp filtering and highly-accurate control and, furthermore, the signal components of the optical DMT signal halve, so that the transmission characteristics deteriorate. On the other hand, the transmission characteristics X4 are the transmission characteristics of the optical DMT signal subjected to VSB shaping according to the first embodiment. In the transmission characteristics X4, when the transmission distance is 0 km, the transmission capacity is 130 Gbps; when the transmission distance is 0 km, the transmission capacity is 110 Gbps; and thereafter, even when the transmission distance varies, the transmission capacity is stable at 105

Gbps. On the other hand, the transmission characteristics X5 are the transmission characteristics of the optical DMT signal subjected to VSB shaping according to the third embodiment. In the transmission characteristics X5, the transmission capacity is stale at 105 Gbps even when the transmission distance varies. In short, the transmission characteristics X4 and the transmission characteristics X5 can secure excellent transmission characteristics compared to the transmission characteristics X15 after SSB shaping.

According to the first to fourth embodiments, any one of the sending device 2 and the receiving device 3 incorporates the acquisition unit 26A, the first determination unit 14C (26B), and the second determination unit 14D (26C). Alternatively, management devices other than the receiving device 3 and the sending device 2 may incorporate them. In that case, the processing load of the receiving device 3 and the sending device 2 can be reduced.

According to the first to fourth embodiments, VSB shaping for removing part of the upper band of the optical DMT signal is performed. Alternatively, VSB shaping for removing the lower band of the optical DMT signal may be performed. Furthermore, according to the first to fourth embodiments, VSB shaping for removing part of the upper band of the optical DMT signal is employed. Alternatively, SSB shaping may be employed although the transmission characteristics are slightly lower than those obtained by VSB shaping.

Between the sending device 2 and the receiving device 3, information of the quotas, etc. is transmitted to the partner sending device 2 or the receiving device 3 via the control line 5 different from the optical transmission path 4. Alternatively, the information of the quotas, etc. may be contained in an OSC signal and the OSC signal may be transmitted to the partner sending device 2 or the receiving device 3.

The optical sending unit 13 according to the first to fourth embodiments is configured of an amplifier, an LD, and a modulator. Alternatively, a direct modulation LD may be used instead of the LD and the modulator.

The acquisition unit 26A according to the first to fourth embodiments may acquire the SNR information before or after the Forward Error Correction (FEC) (not represented) in the latter stage with respect to the demapping unit 24C.

The optical transmission system 1 using the DMT modulation system has been illustrated as the first to fourth embodiments. Alternatively, an optical transmission system using another multicarrier modulation system in which data is allocated to multiple SCs and the sets of data allocated to the respective SCs are modulated may be employed. For example, optical transmission systems using multicarrier modulation systems, such as various PSK modulation systems including the orthogonal frequency division multiplexing (OFDM) modulation system and the quadrature phase shift keying (QPSK) modulation system, may be used. Similarly, differential phase shift keying (DPSK), 8PSK, etc. may be used.

The various components of various units illustrated in the drawings are not necessarily configured physically as illustrated in the drawings. In other words, a specific mode of dispersion and integration of each unit is not limited to that illustrated in the drawings. All or part of the units may be configured by dispersing or integrating the components functionally or physically in accordance with various loads or the usage in an arbitrary unit.

Furthermore, all or an arbitrary part of various processing functions implemented by various devices may be implemented by, for example, a central processing unit (CPU), a digital signal processor (SDP), or a field programmable gate array (FPGA). Furthermore, all or an arbitrary part of the various processing functions may be implemented with a program that is analyzed and executed by the CPU or a hard-wired logic.

The region for storing various types of information may be configured of, for example, a read only memory (ROM) or a random access memory, such as a synchronous dynamic random access memory (SDRAM), a magnetoresistive random access memory (MRAM), or a non-volatile random access memory (NVRAM).

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device comprising:
   a filter that transmits a multicarrier signal that is received from a partner device; and
   a processor coupled to the filter; wherein the processor executes a process comprising:
   measuring transmission characteristics of a probe signal of the multicarrier signal received from the partner device, the transmission characteristics including SNR (signal to noise ratio) information corresponding to each allocated frequency;
   determining a filter frequency of the filter that removes a dip from the multicarrier signal, on the basis of the SNR information in the measured transmission characteristics; and
   setting the determined filter frequency in the filter.

2. The receiving device according to claim 1, wherein, based on the SNR information corresponding to the each allocated frequency in the transmission characteristics, the process further comprises:
   determining the each allocated frequency corresponding to the SNR information having lowered from a reference value by a predetermined level; and
   determining the filter frequency such that the each determined allocated frequency serves as an edge frequency of a transmission band of the filter.

3. A sending device comprising:
   a generator that generates a multicarrier signal;
   a filter that transmits the generated multicarrier signal; and
   a processor coupled to the generator and the filter; wherein the processor executes a process comprising:
   determining, based on SNR (signal to noise ratio) information in transmission characteristics of a probe signal of the multicarrier signal that is measured by a partner device, a filter frequency of the filter that removes a dip from the multicarrier signal, the transmission characteristics including the SNR information corresponding to each allocated frequency; and
   setting the determined filter frequency in the filter.

4. The sending device according to claim 3, wherein, based on the SNR information of the each allocated frequency in the transmission characteristics, the process further comprises:

determining the each allocated frequency corresponding to the SNR information having lowered from a reference value by a predetermined level; and determining the filter frequency such that the each determined allocated frequency serves as an edge frequency of a transmission band of the filter.

5. A sending device comprising:

a generator that generates a multicarrier signal;

a filter that sets an edge frequency of a transmission band at a frequency at which no dip occurs in accordance with increase in a transmission distance of the multicarrier signal and that transmits the multicarrier signal generated by the generator; and a processor coupled to the generator and the filter, wherein the processor executes a process comprising determining a filter frequency of the filter on a basis of a dip in the multicarrier signal having been transmitted through the filter and based on SNR (signal and noise ratio) information in transmission characteristics of a probe signal that is measured by a partner device.

6. The sending device according to claim 5, wherein, based on the SNR information of each allocated frequency in the transmission characteristics of the probe signal that is measured by the partner device, the process further comprises determining the filter frequency such that a frequency of the dip occurring in the multicarrier signal having been transmitted through the filter serves as the edge frequency of the transmission band of the filter.

7. A receiving device comprising:

a filter that sets an edge frequency of a transmission band at a frequency at which no dip occurs in accordance with increase in a transmission distance of a multicarrier signal and that transmits the multicarrier signal received from a partner device; and a processor coupled to the filter, wherein the processor executes a process comprising:

measuring transmission characteristics of a probe signal of the multicarrier signal that is received from the partner device, the transmission characteristics including SNR (signal to noise ratio) information corresponding to each allocated frequency; and determining a filter frequency of the filter on a basis of a dip in the multicarrier signal having been transmitted through the filter and based on the SNR information in the measured transmission characteristics of the probe signal that is received from the partner device.

8. The receiving device according to claim 7, wherein, based on the SNR information of the each allocated frequency in the transmission characteristics of the probe signal that is received from the partner device, the process further comprises determining the filter frequency such that a frequency of the dip occurring in the multicarrier signal having been transmitted through the filter serves as the edge frequency of the transmission band of the filter.

* * * * *